Nov. 6, 1928.

F. P. RENNEBURG 1,690,753

COMBINATION COOKER DRIER

Filed April 17, 1926   6 Sheets-Sheet 1

Inventor

Frederick P. Renneburg,

By Cushman Bryant Darby
Attorneys

Nov. 6, 1928.

F. P. RENNEBURG

COMBINATION COOKER DRIER

Filed April 17, 1926

Inventor

Frederick P. Renneburg,

By Cushman, Bryant & Darby

Attorneys

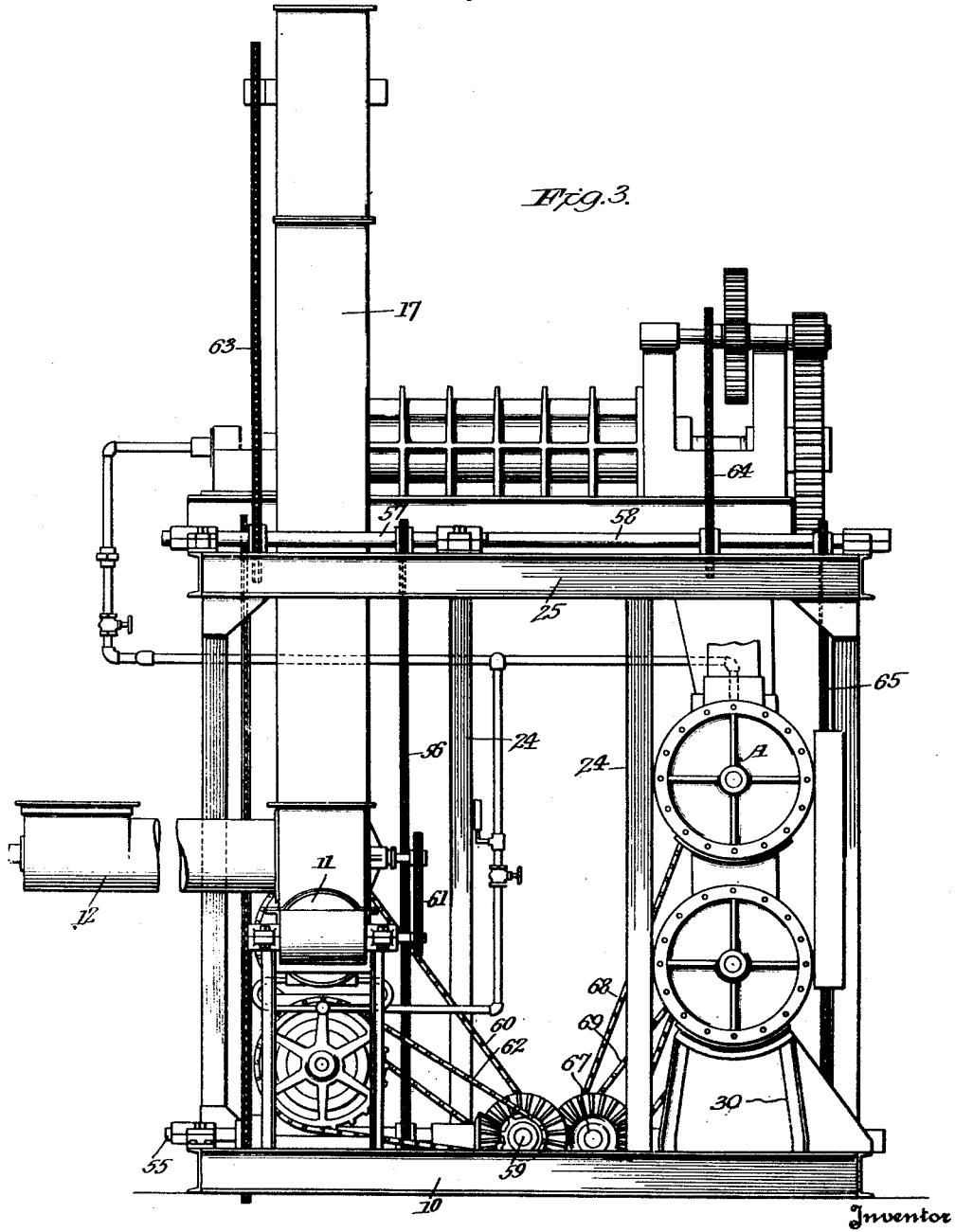

Nov. 6, 1928.
F. P. RENNEBURG
1,690,753
COMBINATION COOKER DRIER
Filed April 17, 1926   6 Sheets-Sheet 4
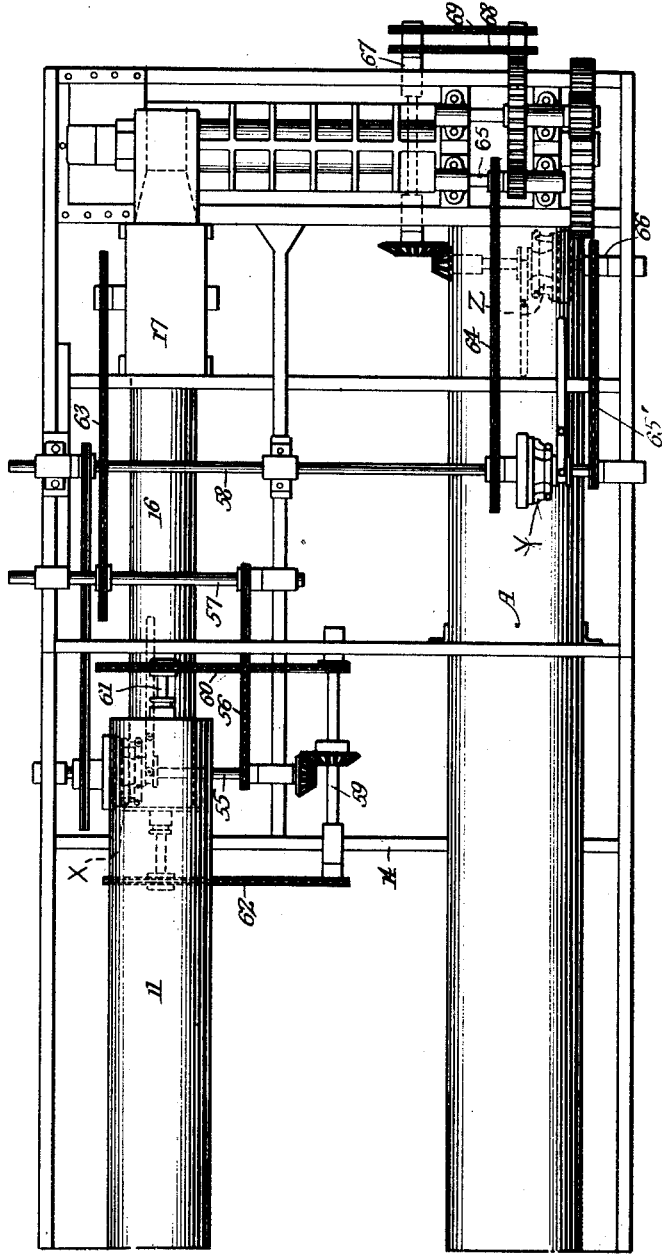
Inventor
Frederick P. Renneburg,
By Cushman, Bryant Darby
Attorneys Nov. 6, 1928.
F. P. RENNEBURG
1,690,753
COMBINATION COOKER DRIER
Filed April 17, 1926 6 Sheets-Sheet 5
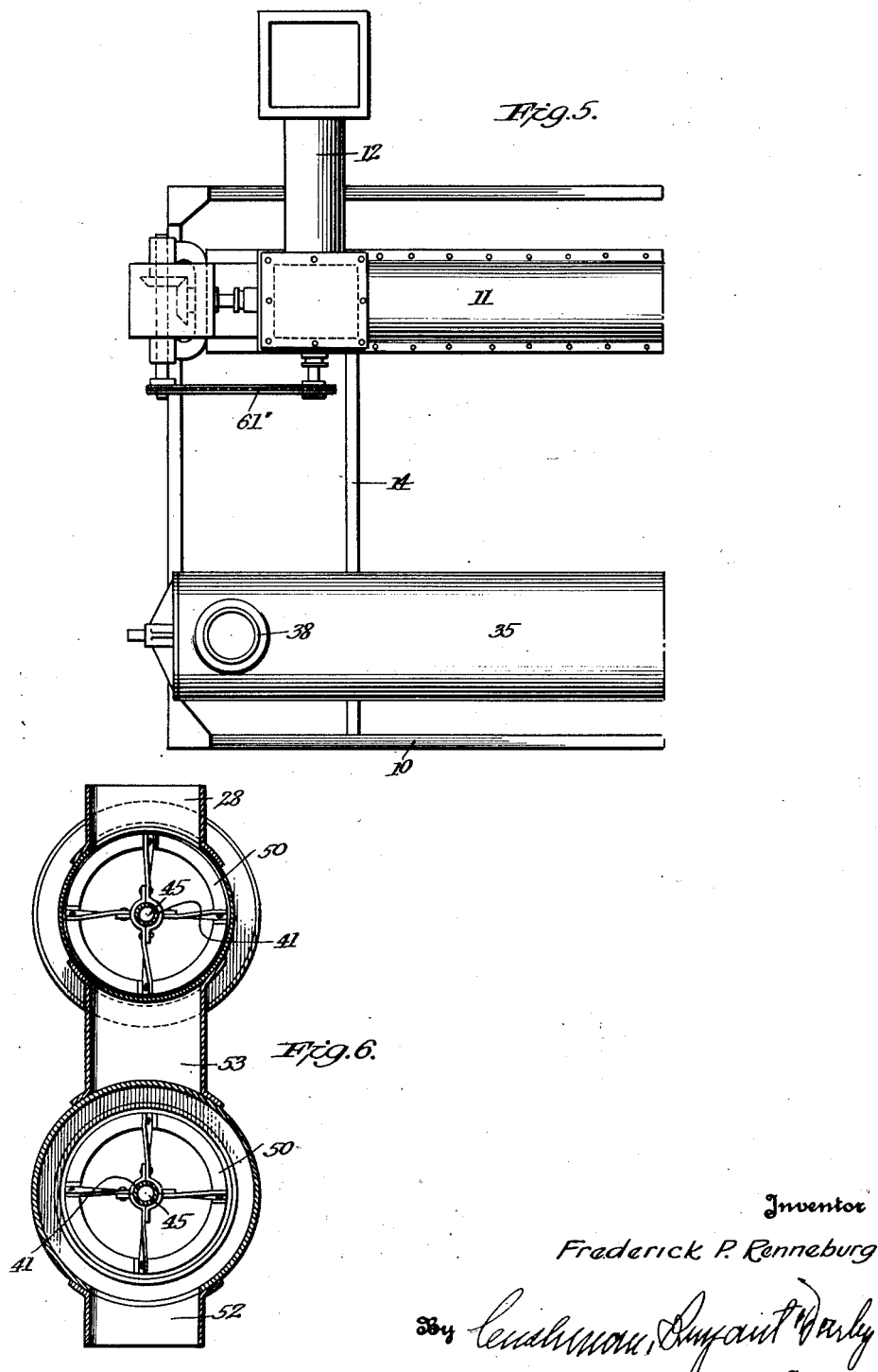
Inventor
Frederick P. Renneburg
By Cushman, Dunpant Varly
Attorneys Nov. 6, 1928. 1,690,753
F. P. RENNEBURG
COMBINATION COOKER DRIER
Filed April 17, 1926 6 Sheets-Sheet 6
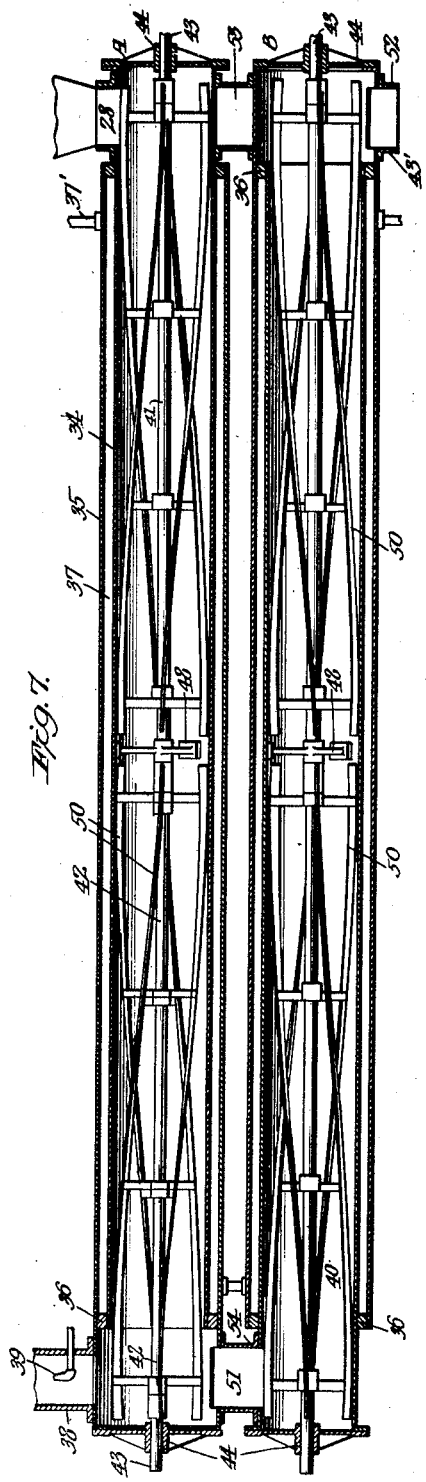
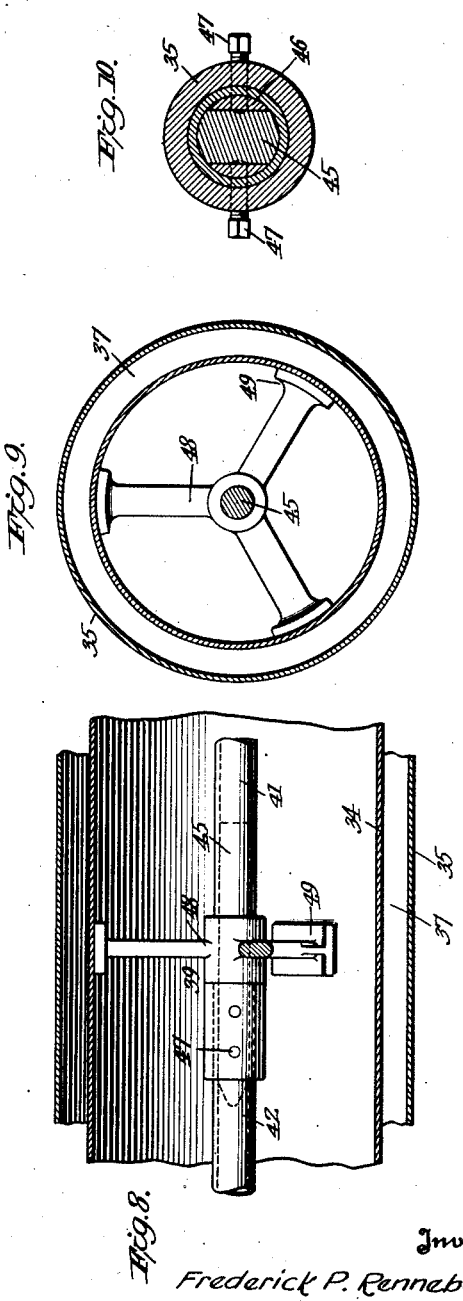
Inventor
Frederick P. Renneburg,
By
Attorneys Patented Nov. 6, 1928.

1,690,753

UNITED STATES PATENT OFFICE.

FREDERICK P. RENNEBURG, OF BALTIMORE, MARYLAND, ASSIGNOR TO EDW. RENNE-BURG & SONS CO., OF BALTIMORE, MARYLAND, A CORPORATION OF DELAWARE.

COMBINATION COOKER DRIER.

Application filed April 17, 1926. Serial No. 102,738.

This invention relates to a machine, which although particularly designed for drying fish, offal and fish scrap, may find utility in the treating of garbage and materials of like character.

The trade has long required a machine in which capacity could be augmented without material change in structure, and wherein a purchaser of such apparatus might increase his operations without sacrificing the parts already on hand so that business expansion could be efficiently cared for without undue expense.

To this end, the several parts of the apparatus, namely, the cooker, elevator, press and drier, and their communicating conveyors are designed for cooperative use to carry out a systematic treatment, or any one or more of the parts may be commissioned to the exclusion of the others under the demands of the practice.

The driers employed are of a novel and efficient nature and means are provided for agitating the material in its passage through such driers while at the same time the drying is carried on without danger of scorching and in the presence of a stream of radiated hot air preferably conducted in the direction of travel of the material. This hot air not only serves as a drying means, but moreover, is a medium by which resultant moisture may be removed from the drier and out of contact with the material at the point of greatest vapor density.

The drying is a continuous operation as distinguished from the usual and unsatisfactory batch system, and by agitating and conveying the material through a heat jacketed drying drum of considerable length in contact with a hot air stream, the drying of the material is effective, and the ensuing moisture is advantageously removed at the point where the possibility of condensation is greatest.

The drier employed also serves as a cooker where the material being treated does not require a distinct cooking treatment and does not possess a sufficient oil content to warrant subjecting it to the usual press.
By means of the drying construction employed, this operation is conducted speedily and efficiently without loss of time and all of the parts of the apparatus may simultaneously function when required since the drying is a continuous operation. On the other hand the driers operate with equal facility when employed independently of the other apparatus.

Any number of driers may be employed and fed from the press or in cases where no cooking or pressure is required, the driers may be supplied from any independent source.

Having in mind that the trade may wish to purchase the various parts as business may require, the apparatus is designed to permit of increasing the drying capacity whereby a user having a single drier, may as exigency demands, add more driers without altering the machine structure or impairing or sacrificing the value of the parts already available.

Efficiency and economy in a practical way, where the margin of profit may at times be small, is the underlying problem of the trade which the present invention has solved.

Referring to the drawings:

Figure 1 is a side elevation of the assembled machine, partly broken away for convenience.

Figure 1ª is a side elevation partly broken away, of the opposite end of the machine shown in Figure 1.

Figure 3 is a similar view.

Figure 4 is a top plan view.

Figure 5 is a similar view, being an extension of Fig. 4.

Figure 6 is a detail end view of the driers.

Figure 7 is a sectional view of the drier batteries.

Figures 8, 9 and 10 are detail views of the drier structure.

Figure 1:
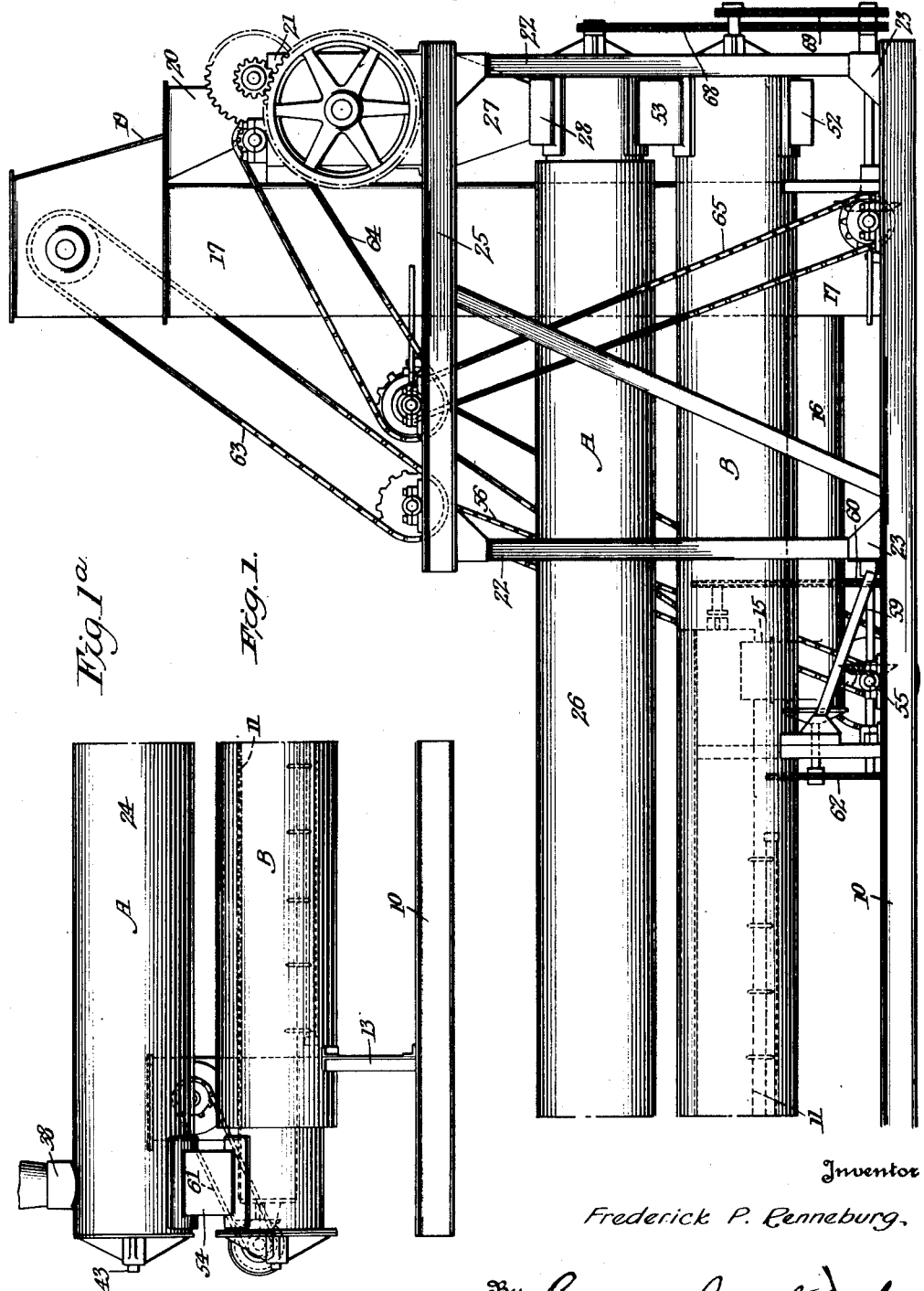

Referring to the drawings, the numeral 10 indicates the base of my machine and is preferably rectangular in form and of channel iron construction.

This base frame may be made rectangular and laterally extensible or sufficiently large to accommodate given sizes of machinery with provision for adding additional apparatus to increase the capacity of operation.

Mounted on the base 10 at one side thereof is a steam cooker 11 having a communicating supply hopper 12 laterally offset with respect to the frame as shown.

The cooker and hopper are supported above the frame by standards 13, mounted upon the cross bars 14 connected to the frame.

The cooker has an internal spiral or other conveyor for discharging the material when properly cooked, through a discharge spout 15 into a longitudinally extending conveyor 16 of any suitable form. The conveyor 16 is supported by the communicating spout 15 and at its other end terminates in communicating relation with an elevator 17 by which it is supported at that end. This conveyor 16 is preferably a closed cylinder having a spiral or other suitable conveyor mounted therein. The elevator is supported on the base by cross pieces similar to the cross piece 14 and extends upwardly from the base frame and the cooker and conveyor.

It will be understood that the material placed in the cooker is passed to the conveyor 16 and then to the elevator 17 from which it is deposited in saturated condition by means of a discharge spout 19 into the hopper 20 of a suitable press 21.

The press 21 is mounted on the frame adjacent one side and in elevated position by standards 22. The standards 22 are connected by angle iron members to the sides and corners of the base frame as shown at 23 and also to a cross piece mounted on the base similar to the cross piece 14.

At their upper ends the standards are connected to angle iron members 25 which serve to support the press, and incidentally, to sustain the elevator in upright position.

The frame structure for the press and more particularly the elevated frame members 25 also serve to support the operating construction for the press and elevator and the operating mechanism for other of the parts of the apparatus.

The standards 22 may be made extensible so that the height of the press may be increased as desired.

The press may be of conventional design and of suitable capacity for use in the particular operation. From the press material relieved of its oil content and some of its moisture is deposited in a saturated condition in a drier 26 of novel form by means of a discharge spout 27 communicating with an inlet 28 of novel form mounted at one end of the drier.

The drier is positioned upon the frame along one side thereof opposite the cooker 11 and conveyor and elevator 16—17. The drier is mounted upon spaced cross pieces, some of which have been previously described and additional cross members all similar to the cross pieces 14 connected to the frame, and is positioned at the required height by angle iron supports 30 of novel design mounted on such cross pieces.

With the drier disposed at the opposite longitudinal side of the press frame from the cooker and elevator and the press mounted adjacent one lateral side of the base frame, provision is made for adding additional driers which may be mounted upon the base frame between the parts just described. This mounting may be accomplished without change in the assembly or alteration of the apparatus already in position, since the second drier need only be positioned within the space defined between the cooker and elevator on the one side and the initial drier on the other, with its inlet end adjacent the discharge chute of the press.

Figure 2:
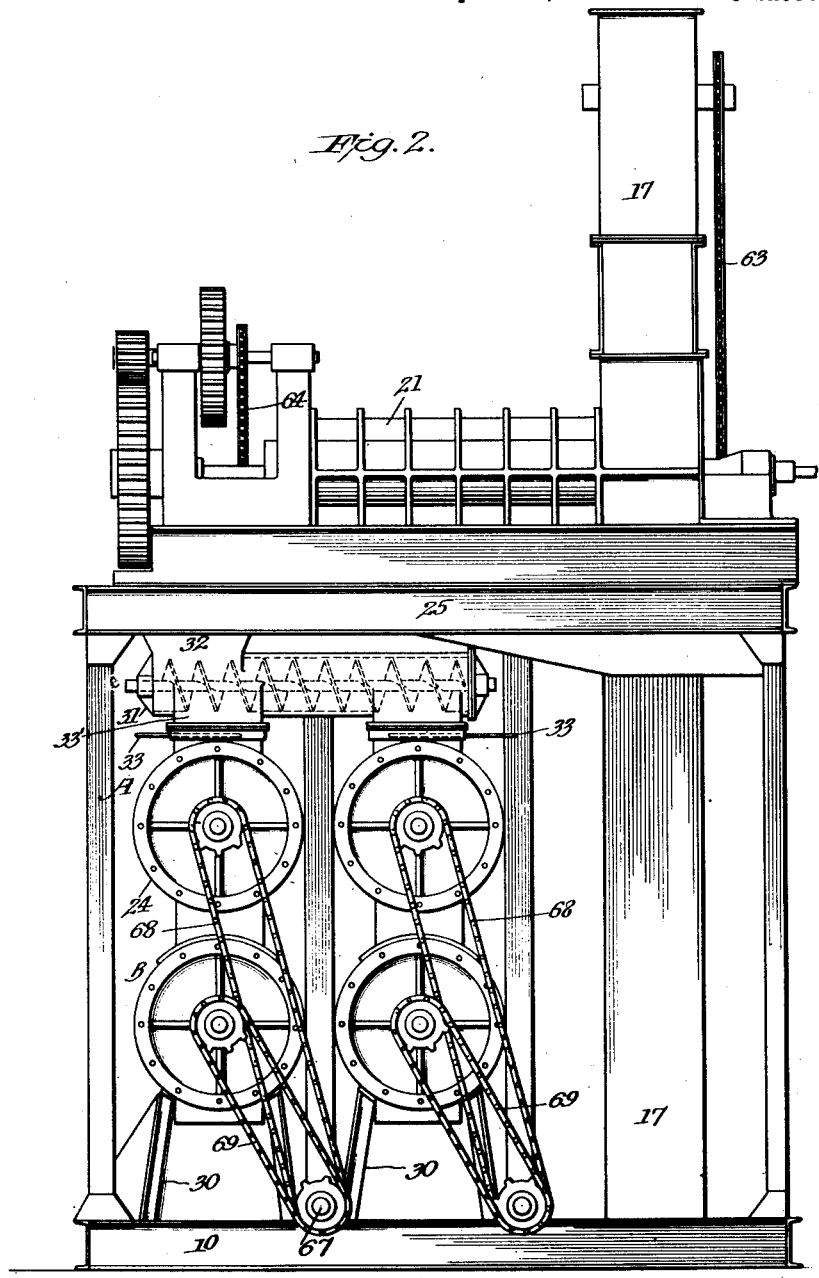
Figure 2 is an end elevation.

The use of additional driers by reason of the novel disposition and mounting of the parts of the apparatus is shown in Fig. 2 where two batteries of driers are illustrated.

Referring to Fig. 3 there are provided standards 24 connected at the base to one of the cross bars and at their upper ends to one of the cross members 25. One of these members 24 provides in connection with the adjacent standard 22 a guide for a drier battery and the intermediate standards 24 form a similar guide for use when an additional drier battery is added to the apparatus.

It will be understood that the apparatus may be supplied by initially installing a drier or a series of drier batteries mounted upon the base and the additional apparatus and driers may be installed as required. In this manner a small purchaser is rendered secure in his ownership, against the natural expansion of operations, since the units may be added without substantially altering the original apparatus.

Referring to Fig. 2 it is to be seen that two batteries of driers are employed and in this case a screw conveyor or other suitable distributor 31 is mounted upon the supporting structure for the press whereby the discharge outlet of the press will communicate with a receiving inlet 32 of the distributor. The distributor is preferably mounted in parallel relation with the press and is simultaneously operable with the press.

This distributor 31 is provided with gates or valves 33 mounted in its distributing spouts 33′. By this arrangement the gates or valves 33 may deliver material first to one battery of driers and then to another or obviously to any single drier. The arrangement permits continuous operation of the apparatus and drying of the material.

The driers are of novel construction and as shown consist of two cylindrical communicating drums A and B mounted in vertical alignment. While a single drum may be employed I find it desirable to use two or more driers vertically aligned as shown. These driers are of such construction that the disadvantages of the batch system of drying is overcome and speedy and continuous drying is accomplished. Referring to Figures 7, 8, 9 and 10, it will be seen that the drums are of considerable length and as stated are cylindrical and preferably made of metal. Since the drums A and B are similar in construction a description of one will suffice for both.

The drum A comprises an inner cylinder 34 and an outer cylinder 35. The cylinders are telescoped as shown. The inner cylinder at one end extends beyond the adjacent end of the outer cylinder and at the opposite end, the outer cylinder projects beyond the adjacent end of the inner cylinder. Adjacent their ends, the cylinders are spaced apart by sealing means such as a metallic or flexible ring 36. There is thus defined between the cylinders a sealed space providing a heating jacket 37 into which steam is supplied by means of a pipe 37'.

The inlet port 28 previously referred to, is mounted in the exposed end of the inner cylinder as shown, and at the opposite end of the drier the cylinder is provided with a stack 38. Within the stack 38 is an aspirator or blower 39. In operation, if material is being treated in the drier, the aspirator or blower is operated to force a current of air through the drier and over the material, and withdraws in this manner all of the moisture extracted and which is confined in this air current.

Mounted to rotate within the drier, is a shaft 40 which is formed of hollow sections 41 and 42. At their outer ends the hollow sections are shrunk upon suitable solid rounded members 43 which are journaled in the adjacent ends of the driers, as shown at 44, so that the ends of the respective drums serve as bearings for the shaft 40. Intermediate their ends, the sections are rotatably connected by a member 45 which is shrunk into the adjacent end of the section 41 and is wedged into the adjacent end of the other section 42. This wedging is accomplished by means of wedge members 46 fitted into the section 42 adjacent the flat sides of the connecting member 45 and such wedges are held securely in position by screws 47 which pass through a reenforcing cylinder mounted over the adjacent end of the section 42 and through the shaft section to engage the wedge and the connecting member as shown best in Figure 10.

Journaled upon the connecting member between the ends of the sections is a bearing or intermediate supporting member 48 which is provided with radial arms and curved feet 49 to frictionally engage the wall of the inner cylinder to provide a stationary support and bearing for the shaft, in the middle of the drier.

Mounted upon the shaft sections are a plurality of spiral shelves 50 which serve the purpose of agitating and conveying the material through the drum. These shelves are supported upon the shaft sections by radial arms, and are of such construction that they will run close to the bottom of the casing leaving an unobstructed space between the arms and shelves for the passage of moisture. The adjacent intermediate ends of the spirals terminate in alignment so that material being treated has an unobstructed passage through the drum.

When material is deposited in the upper drum A, it is so saturated that the heat of the jacket with which it is thrown into contact, will not scorch it and moreover, the possibility of burning is eliminated since the material is rapidly conveyed and so agitatied that various parts are continuously being subjected to direct contact with the heated wall of the drum.

The material in the drum A is not only thoroughly agitated and all portions subjected to the heat of the drying medium but the disintegrated mass is moreover subjected to the stream of air propelled through the drum by the aspirator 39. This stream of air is heated by radiation from the wall of the drum and serves to dry the material and also acts as a carrier for the moisture extracted during the drying operation. The evaporated moisture is thus conveyed through the drier to the stack where it is withdrawn. The point of withdrawal of the moisture has been found to be that stage when the air stream is most nearly saturated and consequently when the possibility of condensation is the greatest.

Arranged in the wall of the outer drum at a point opposite the stack and aspirator, is a discharge port 51 communicating with the drier B. It has been found that the material passed from the drum A to the drum B is almost completely devoid of contained moisture and treatment in the drum B serves to produce a thoroughly dried substance. The action of the aspirator is to some extent effective in connection with the drum B, principally adjacent the discharge port 51 at which point it will be noted the outer cylinder and inner cylinder are free from the jacket, and thus no condensation will occur at these points by reason of the absence of a direct heating means, due to the influence of the aspirator.

It will thus be seen that saturated material passed to the drum A is subjected to the heat of the surrounding heating jacket and by reason of its saturated condition and the fact that different parts of a continuous disintegrated mass are thrown into heating relation while being conveyed to the drum, all danger of scorching is overcome. Evaporation is facilitated by means of the radiated air current and this air current likewise provides the means for eliminating condensation at the critical point in the drying operation.

It will be observed that the material is conveyed through the several driers in opposite directions and is discharged from the drier B by means of the outlet or chute 52, delivering to a conveyor which carries the dry material over to an independent grinder of any suitable type. The conveyor for the dried material is open and by reason of this construction, the material will be sufficiently cooled prior to grinding.

In some cases it is desirable to mount three or more drums to accomplish the drying operation and it will be understood that this can be readily done when occasion requires. It will be noted that the drums are mounted in spaced relation and this is accomplished by reason of a peculiar element which applicant has found very desirable. This member is hollow and has lateral flanges at its ends. It may be used as the spacing and supporting means for the drums at one end as shown at 53 and at the other end provides the discharge port indicated as 54. This member may be cut in two sections and provide the inlet for the drum A as shown at 28 and the outlet for the drum B shown at 52. This is an important feature since it permits of a standard construction being employed and facilitates the easy mounting and addition of drums to the drier system when required.

It will here be noted that the operation of drying is continuous as distinguished from the batch system and that a speedy and complete drying is effected.

In addition, in some cases where the fish or offal contains no oil, the drying system will serve as a cooker and thus the other parts of the apparatus are not necessary.

The cooking operation is possible by reason of the temperature which may be maintained during the agitation and conveying of the material through the drums. Also the cooking is facilitated by reason of the extraction of the evolved moisture in the radiated air stream.

Where the several parts of the apparatus are not available, the material may be conveyed to the drier or group of drying elements from a hopper of suitable structure or a distributor, similar to that previously described, may be employed. Thus by reason of the construction of the drying system it may be employed as a combination cooker and drier without recourse to other parts of the apparatus.

It is an important feature of the invention that the several parts of the apparatus heretofore described, may be simultaneouly operated or each operated independently.

To this end, the cooker 11, hopper 12, conveyor 16 and elevator 17 are operable as a unit. A shaft 55 is mounted upon the base and at one end is provided with a sprocket chain connection 56 to a shaft 57 mounted upon the elevated structure which supports the press. Motion is communicated from a shaft 58 to the shaft 55. At one end the shaft 55 is provided with a gear meshing with a second gear on a shaft 59. This shaft 59 has a sprocket chain connection 60 with a shaft 61 whereby the conveyor in the cooker is operated. At the end adjacent the hopper, the shaft of the cooker conveyor is provided with gearing to mesh with suitable gearing for operating by means of a sprocket chain 61' the conveyor mounted in the hopper 12. At its other end the shaft 59 has a sprocket chain connection 62 with the shaft of the conveyor mounted within the drum 16 between the elevator and the cooker. The shaft 57 has a sprocket chain connection 63 with a shaft on the elevator so that this member is simultaneouly operable with the parts just described.

Motion is transmitted from the shaft 58 to the shaft 55 and there is mounted upon the shaft 55 a suitable clutch mechanism X whereby the shaft 55 may be thrown out of operation to discontinue the operation of the hopper, cooker, conveyor and elevator. This is important because when all of the material has been delivered to the press these parts are no longer required and hence in the present construction may be readily cut out.

The shaft 58 as shown, is mounted upon the upper frame structure and at one end has a sprocket chain connection 64 with a shaft 65 having suitable gearing thereon meshing with gearing for operating the press. The distributor heretofore referred to, and indicated at 31, may have a sprocket chain connection with the operating means for the press so that these two simultaneously operate.

Mounted upon the shaft 58 is a clutch Y similar to the clutch X and by reason of this clutch, the press and distributor may be readily operated and thrown out of use. This is important since the press need not be operated until its hopper 20 is full and also when all of the material has been delivered to the driers, there is not further need to keep the press in operation.

The shaft 58 has a sprocket chain connection 65' with a shaft 66 mounted upon the base frame. This shaft 66 is geared to a second shaft 67 extending outwardly from the end of the base frame adjacent the driers. This shaft 67 has sprocket chain connections 68 and 69 with the shafts 40 of the respective driers. Mounted upon the shaft 66 is a clutch Z similar to the clutch members X and Y, whereby the drier need not be operated until ready to receive the material and hence there is no waste of power as would be the case if it were continuously operated when free of material.

It will be, therefore, seen that the invention provides a combination cooker and drier which is distinguished by a continuous drying system which is utilizable to perform a cooking operation when required.

It is furthermore to be noted that the novel positioning of the parts and operating means enables the machine to be sold in units and to permit of the additional installation of driers as well as the other parts of the machine without substantially altering the original and standard structure.

The driers are of novel form and there is no possibility of scorching, but on the other hand by reason of the slow conveying of the material and its simultaneous agitation, it is completely dried and the extracted moisture is removed in the radiated air current which also serves as a drying means.

Where the drier is used as a cooker the fish is cooked in its own liquor and then dried making a highly flavored meal.

By having the parts co-operable and independently as well as simultaneously capable of actuation, the facility with which the apparatus may be employed is greatly enhanced.

It will be understood that my invention may be changed and altered, in various ways, but such changes I consider to come within the scope of my improvements and the departures which I have here made from the prior machines of this character.

What I claim is:

1. In a apparatus of the class described, a base, a cooker and hopper mounted at one side thereof, an elevator mounted on said base and communicating with said cooker and in alignment therewith, a press adjacent said cooker and at an angle thereto, said press being mounted in elevated position on said base, and a drier mounted on the opposite side of said base from said cooker and elevator, and communicating with said press, means whereby the cooker and elevator structure are spaced from said drier and additional drying members may be mounted upon the base within said space and in communication with said press.

2. In an apparatus of the class described, a plurality of rendering instrumentalities, including cooker, elevator, press and drier, each of said instrumentalities being in communication, means for operating all of said instrumentalities continuously and successively and for allowing the operation of one or more to the exclusion of the others, the said cooker and elevator being so disposed with relation to the press and drier that additional drier elements may be added without disturbing the position of any of the instrumentalities and permitting regular distribution from the press to the several driers.

3. In an apparatus of the class described, a plurality of rendering instrumentalities, including cooker, elevator, press and drier, each of said instrumentalities being in communication, means for operating all of said instrumentalities continuously and successively and for allowing the operation of one or more to the exclusion of the others, a distributor associated with said press, the said cooker and elevator being so disposed with relation to the press and drier that additional drier elements may be added without disturbing the position of any of the instrumentalities and permitting regular distribution from the press to the several driers.

4. In an apparatus of the class described, a plurality of rendering instrumentalities, including cooker, elevator, press and drier, each of said instrumentalities being in communication, means for operating all of said instrumentalities continuously and successively and for allowing the operation of one or more to the exclusion of the others, a spiral conveyor distributor associated with said press, the said cooker and elevator being so disposed with relation to the press and drier that additional drier elements may be added without disturbing the position of any of the instrumentalities and permitting regular distribution from the press to the several driers, and means for selectively distributing material to said driers.

5. In an apparatus of the class described, a drier and rendering instrumentalities, the drier and instrumentalities being in communication, means for operating all of said members continuously and successively and for allowing the operation of one or more to the exclusion of the others, the drier being so disposed with relation to the other instrumentalities that additional drier members may be added without disturbing the position of any of the instrumentalities and permitting regular distribution to the several driers.

In testimony whereof I have hereunto set my hand.

FREDERICK P. RENNEBURG.